United States Patent [19]

Chow et al.

[11] 4,353,199

[45] Oct. 12, 1982

[54] STONE DETECTOR FOR HARVESTING MACHINES

[75] Inventors: Mark K. Chow, Leola; Shaun A. Seymour, New Holland, both of Pa.; Cal L. Bryant, Niles, Ill.

[73] Assignee: Sperry Corporation, New Holland, Pa.

[21] Appl. No.: 254,319

[22] Filed: Apr. 15, 1981

[51] Int. Cl.³ .............................................. A01F 12/16
[52] U.S. Cl. .................................. 56/10.2; 130/27 J T
[58] Field of Search ....................... 56/10.2, DIG. 15; 130/27 J T; 336/123; 340/684

[56] References Cited

U.S. PATENT DOCUMENTS

| | | | |
|---|---|---|---|
| 3,268,880 | 8/1966 | Miller | 336/123 |
| 3,519,969 | 7/1970 | Hoffman | 336/123 |
| 3,535,618 | 10/1970 | Perrins | 336/123 |
| 3,675,660 | 7/1972 | Girodat | 56/DIG. 15 |
| 3,758,845 | 9/1973 | MacKelvie et al. | 336/123 |
| 3,805,798 | 4/1974 | Girodat | 56/DIG. 15 |
| 3,959,953 | 6/1976 | Garrott | 56/DIG. 15 |
| 3,964,042 | 6/1976 | Garrott | 340/551 |
| 3,972,156 | 8/1976 | Bennett, Jr. | 56/DIG. 15 |
| 4,004,289 | 1/1977 | Kirk | 56/DIG. 15 |
| 4,294,062 | 10/1981 | Seymour | 56/10.2 |

FOREIGN PATENT DOCUMENTS

| | | | |
|---|---|---|---|
| 53446 | 1/1967 | German Democratic Rep. | 56/DIG. 15 |
| 563137 | 7/1977 | U.S.S.R. | 56/DIG. 15 |

*Primary Examiner*—Paul J. Hirsch
*Attorney, Agent, or Firm*—Frank A. Seemar; Larry W. Miller; Darrell F. Marquette

[57] ABSTRACT

The unpredictability of the actual characteristics of spurious sounds has resulted in the use of electronic filtering or comparator circuits being less than satisfactory in certain cases, such as for distinguishing between machinery sounds and foreign objects in the machinery. An acoustically based stone detector is provided for use on a field harvesting machine. A piezoelectric acoustic detector is attached to the central support web of a feed roll within the frame of the harvester, and a rotating transformer is used to transmit the signal from the feed roll to the frame. The air core rotating transformer is built with one coil rotating with the feed roll and the other coil stationary on the frame. Electronic circuitry is used to process the signal and control the harvester action to protect the cutter blades from damage by detected stones, either by stopping the machine or mechanically ejecting the stones.

6 Claims, 4 Drawing Figures

STONE DETECTOR FOR HARVESTING MACHINES

BACKGROUND OF THE INVENTION

This invention deals generally with agricultural harvesting machines and more specifically with apparatus for detecting the presence of foreign objects such as stones within the crop material processed by such machines.

The problem of foreign materials within crop material being processed by agricultural harvesting equipment moving across the actual farm fields is well recognized. Magnetic detection systems have been previously patented, such as U.S. Pat. No. 3,964,042 by William L. Garrott, which use magnetically sensitive systems to detect the presence of ferrous material in the crop material and protect the machine from damage.

Acoustically activated detection systems have also been described in U.S. Pat. No. 3,675,660 and U.S. Pat. No. 3,805,798, both by Girodat. These acoustically triggered systems are theoretically capable of detecting both ferrous materials and non-ferrous materials, such as stones, but have severe limitations in that they respond to noise created by the mechanical operation of the machine itself. Such spurious responses cause undesirable stoppages in the harvesting procedure, and considerable effort has been directed to their elimination.

Typically, the approach has been to electronically discriminate the types of noises caused by actual foreign objects from the type caused by the machinery, by the use of electronic filtering or comparator circuits, but such methods have never proved completely satisfactory, possibly because the actual characteristics of spurious sounds is so unpredictable that the choice seems to be in accepting false indications or missing true ones.

The foregoing illustrates limitations of the known prior art. Thus, it is apparent that it would be advantageous to provide an alternative directed to overcoming one or more of the limitations as set forth above.

Accordingly, a suitable alternative is to provide a sensor in an area of the machine which is itself already acoustically isolated or can easily be isolated, from machine and externally generated noise.

SUMMARY OF THE INVENTION

In one aspect of the present invention, this is accomplished by providing a stone detector for harvesting machines including acoustic sensing means attached within the core of a feed roll and generating electronic signals in response to impacts of objects upon the surface of the roll. Means are provided for transmitting the electronic signals from the acoustic sensing means. A signal processing circuit is connected to the transmitting means which operates on signal from the acoustic sensing means and initiates a control sequence to protect the cutting blade of the harvesting machine.

The foregoing and other aspects will become apparent from the following detailed description of the invention when considered in conjunction with the accompanying drawings. It is to be expressly understood, however, that the drawings are not intended as a definition of the invention but are for the purpose of illustration only.

DETAILED DESCRIPTION OF THE INVENTION

Figure 1:
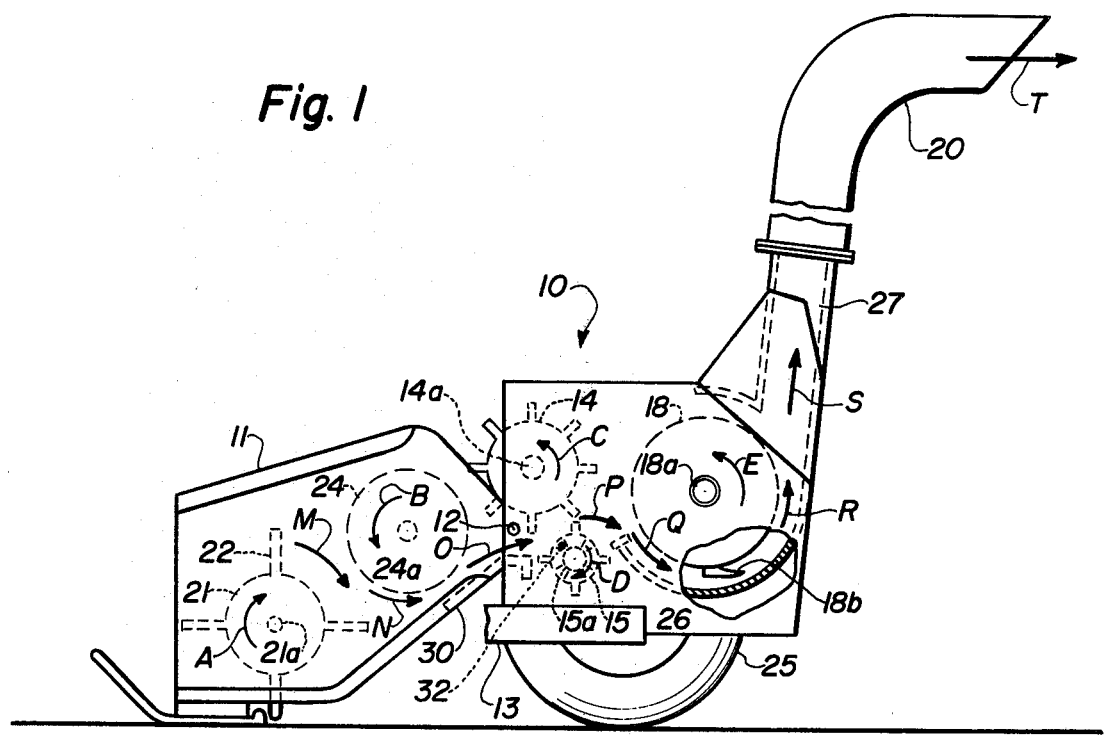
FIG. 1 is a simplified side view of a typical forage harvester machine within which the preferred embodiment of the invention is installed.

FIG. 1 illustrates an improved forage harvesting machine of the kind in which the present invention may be employed. It is apparent that the invention may also be employed with benefit for the protection of other types of farm machinery, and that it has other monitoring and alarm actuating applications, aside from protecting farm machinery from damage caused by the ingestion of stones and other similar objects. The particular forage harvester of FIG. 1 is a representative farm machine and is similar to that described by T. W. Waldrop and H. C. Eberly in U.S. Pat. No. 3,523,411 for a "Forage Harvester Device", issued Aug. 11, 1970, and assigned to the Sperry Rand Corporation.

The forage harvester of FIG. 1 includes a wheel mounted frame or housing construction 10 for supporting a forage cutterhead 18, and a crop pickup unit 11 is pivotally mounted at 12 for support, in part from the basic vehicle framework 13, by which the harvester may be towed by a suitable tractor (not shown). The harvester further includes at least one set of feed rolls 14 and 15, mounted for rotation about substantially parallel axes 14a,15a and journaled in housing 10. A forage cutterhead assembly 18 is mounted within housing 10 spaced from rollers 14 and 15 for rotation on shaft 18a and for receiving forage material ejected from rolls 14 and 15. A discharge spout 20 extends generally vertically and then horizontally from the rearward portion of housing 10.

The crop pickup unit 11 comprises a conventional rotatable reel 21 on a shaft 21a having plural radially projecting, laterally spaced pickup tines or fingers, such as tine 22. A plurality of conventional laterally spaced stripping or doffing members (not shown), between which the tines 22 pass as reel 21 rotates the tines into housing 11, lifts the crop into the region of influence of a conventional rotatable auger 24. Auger 24 has oppositely directed helical flights for directing the crop material from both sides of the auger input toward its center and therefore into the input of the feed rollers 14 and 15. Auger 24 is mounted for rotation on shaft 24a and may be of the general type described by L. M. Halls and H. G. McCarty in U.S. Pat. No. 3,324,639 for "Auger Header and Crop Conditioner" issued June 13, 1967, and assigned to the Sperry Rand Corporation.

Although a crop pickup 11 is shown in FIG. 1, it is apparent that a sickle bar or row crop attachment could also be employed to deliver crop material into feed rolls 14 and 15. In the unit shown, harvested crop material to be comminuted is picked up by the reel 21 and auger 24 of crop pickup unit 11 and is delivered by them to the feed rolls 14 and 15. From the rolls 14 and 15, the crop material is metered in a compacted mat-like form to cutterhead 18, where it is comminuted by a rotating array of knives such as knife blade 18b and is finally discharged through spout 20 into a suitable receptacle, such as a truck or farm wagon (not shown).

Upon consideration of the above-mentioned Waldrop et al U.S. Pat. No. 3,523,411, it will be clear that, for the sake of simplifying the drawing of FIG. 1, a vehicle wheel companion to wheel 25 has not been shown in the drawing of FIG. 1. Also, a plurality of drive belts or other drive means by virtue of which elements including reel 21, auger 24 and rolls 14 and 15 are driven with respect to the power source driving shaft 18a and therefore with respect to cutterhead 18 are absent for the sake of simplifying FIG. 1. Such devices are fully described in the above-mentioned Waldrop et al patent and elsewhere and provide means for driving the various rotatable elements at appropriate rotational speeds in the directions indicated by arcuate arrows A,B,C,D and E. When operated in such fashion, the flow of crop material is over reel 21 and into auger 24, along the paths of arrows M and N and along path O into rolls 14 and 15. Ejected from rollers 14 and 15 along path P into cutterhead 18, the cut forage then follows paths Q and R between the rotating cutterhead 18 and guide 26, and finally moves upward along path S within pipe 27 and out of spout 20 along path T. In traversing paths N and O toward rolls 14 and 15, the forage material passes over a shaped floor plate 30 indicated in a general fashion by the dotted lines in FIG. 1.

It will be understood that the dimensions and proportions shown in FIG. 1 and in the several figures yet to be discussed are selected for the sake of making the drawings clear, and are therefore not necessarily dimensions or proportions which would be used in actual practice.

During various operations using such farm tools, such as sowing, planting, mowing, raking or the like, it is possible for stones and other non-frangible materials to be picked up by the harvester pickup unit 11 and pass into the environs of the cutterhead 18, causing extensive damage to it.

To prevent such damage during the harvesting operation, it is desired to place a stone detector in the path M-N-O-P that the crop travels in moving toward cutterhead 18. The stone detector is placed in such a location that sufficient time is allowed in which manually or automatically to stop the cutting action or deflect the stones out of the machine before they reach cutterhead 18. The towing tractor may also readily be stopped automatically or by the operator in response to a detector actuated alarm.

Figure 2:
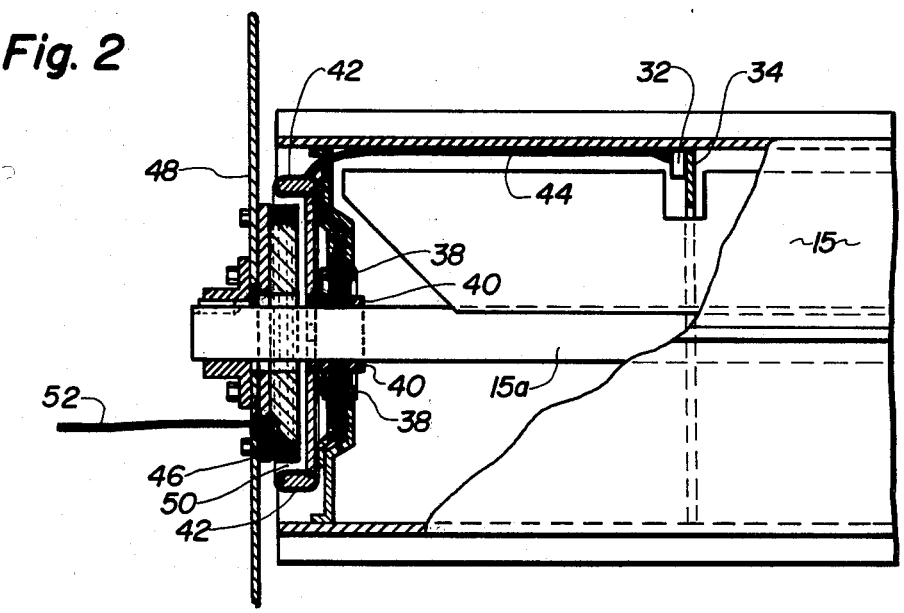
FIG. 2 is a cutaway view of a feed roller of the forage harvester of FIG. 1 showing the location of the acoustic sensor and the signal transformer.

In order to accomplish such detection of the presence of stones or other hard objects within the crop material, acoustic sensor 32 is mounted upon web 36 of feed roll 15 as described in more detail in conjunction with FIG. 2.

FIG. 2 shows a typical feed roll 15 which rotates upon shaft 15a upon which the present invention is installed. Piezoelectric acoustic sensor 32 is attached to the inside of roll 15 by strut 34. Sensor 32 is thus able to respond to objects impinging upon all surface portions of roll 15, since strut 34 provides direct acoustical coupling to multiple areas on the roll surface across the roller cross section. Roll 15 is, however, acoustically isolated from field and machine generated sounds by shock mounts 38 and 40 which isolate the body of roll 15 from shaft 15a.

Means are operably connected for transmitting electronic signals from acoustic sensor 32. Although such means can include a known fiber optic device or a known slip ring device, it is preferred that a rotating coil 42 and a stationary coil 46 are used.

Transformer coil 42 is generally cylindrical in configuration and is mounted upon and rotates with roll 15 and is connected in piezoelectric sensor 32 by means of cable 44. Transformer coil 46 is also cylindrical but is, however, mounted upon harvester frame 48 and remains stationary. Air gap 50 is maintained small enough to permit satisfactory signal transfer from coil 42 to 46 and large enough to permit mechanical clearances for safe rotation of roll 15. Signal coupling across the gap is consistent despite the rotation of one coil and, in fact, the air core furnishes a high pass filter effect which blocks the lower frequencies frequently characteristic of machine and field noise.

Figure 4:
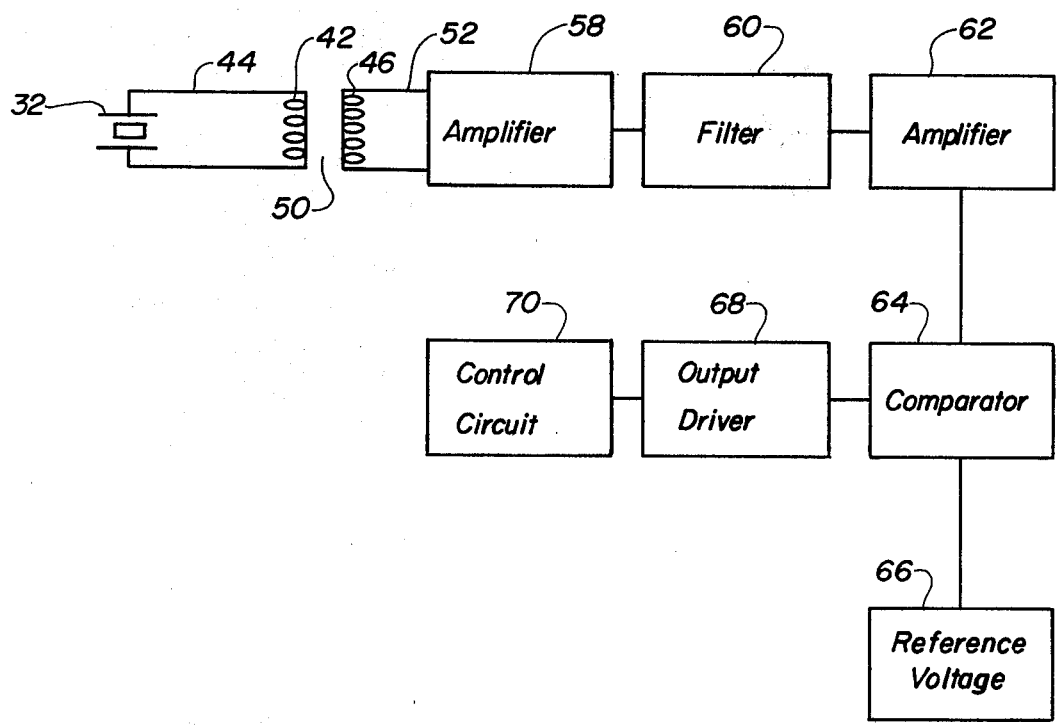
FIG. 4 is a simplified block diagram of the electronic detector circuit of the invention.

Cable 52 is used to connect stationary transformer coil 46 to the signal processing electronic circuit as shown in FIG. 4.

Figure 3:
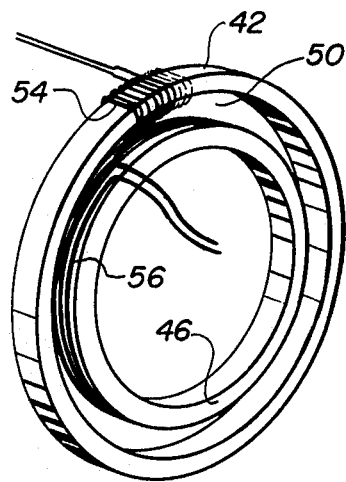
FIG. 3 is a perspective view of the signal transformer of the preferred embodiment of the invention.

FIG. 3 shows a perspective view of transformer coils 42 and 46 before installation in the harvesting machine. In the preferred embodiment cylindrical rotating coil 42 and cylindrical stationary coil 46 are coaxial to each other, and rotating coil 42 is of larger diameter so that its inner surface faces the outer surface of stationary coil 46. Gap 50 separates these two surfaces. Rotating coil 42 is wrapped in a toroidal configuration as shown by wires 54, while stationary coil 46 is coiled circumferentially as shown by wires 56. These particular coil configurations can be varied for particular applications.

FIG. 4 is a simplified block diagram of the electronic signal processing circuit used with the present invention.

Piezoelectric acoustic sensor 32, attached to rotating coil 42 by cable 44, generates an electronic signal in response to acoustic impact on the feed roll and the signal is transferred across air gap 50 to stationary coil 46. Cable 52 transmits the signal to amplifier 58 and the signal is then processed, in turn, by filter 60 and second amplifier 62 and then applied to comparator 64. Comparator 64 generates an output signal only if the input signal it receives is greater than reference voltage 66, and thus discriminates between a true stone impact and background noises.

The output from comparator 64 then acts upon output driver 68 which initiates a control sequence within control circuit 70. Control circuit 70 can be used either to stop the machine motion to prevent cutter damage or to operate a deflecting mechanism to prevent the stones from reaching the cutter.

In either case the present invention initiates the important function of protecting the cutter blades from damage while eliminating unnecessary shut downs or loss of crop by false actuation of deflectors. Field tests on the preferred embodiment have demonstrated a 98 to 100 percent detection rate with no false alarms when the harvester was run over a testing obstacle course.

The foregoing has described a sensor in an area of a machine which is itself already acoustically isolated or can easily be isolated from machine and externally generated noise.

It is anticipated that aspects of the invention, other than those specifically defined in the appended claims, can be obtained from the foregoing description and the drawings.

Having thus described the invention, what is claimed is:

1. A stone detector for use in harvesting machines of the type containing feed rolls operating to move crop material toward a cutting blade comprising:

acoustic sensing means attached within the core of a feed roll for generating electronic signals in response to impacts of hard objects upon the surface of the roll;

means operably connected for transmitting said electronic signals from the acoustic sensing means; and an electronic signal processing circuit means connected to the transmitting means operative in response to the signal from the acoustic sensing means for initiating a control sequence to protect the cutting blade of the harvesting machine.

2. The stone detector of claim 1 wherein the transmitting means includes:

a rotating coil attached to rotate with the feed roll and electronically interconnected to the acoustic sensing means; and a stationary coil attached to the frame of the harvesting machine, and located with one surface of the stationary coil in close proximity to but with mechanical clearance from a mating surface of the rotating coil.

3. The stone detector of claim 1 wherein the acoustic sensing means is attached to the inside surface of the feed roll.

4. The stone detector of claim 1 wherein the acoustic sensing means is acoustically coupled to multiple areas on the roll surface across the roller cross section.

5. The stone detector of claim 1 wherein the inside roll surface to which the acoustic sensing means is coupled is isolated from the frame of the harvesting machine by acoustic isolating means.

6. The stone detector of claim 1 wherein the acoustic sensing means is a piezoelectric sensor.

* * * * *